UNITED STATES PATENT OFFICE.

ROBERT SCHULER, OF NEW YORK, N. Y., ASSIGNOR, BY MESNE ASSIGNMENTS, TO THE GIBRALTAR STONE COMPANY, A CORPORATION OF OHIO.

WATERPROOF CEMENT AND METHOD OF MAKING.

1,081,155.  Specification of Letters Patent.  Patented Dec. 9, 1913.

No Drawing.  Application filed March 18, 1913.  Serial No. 755,244.

*To all whom it may concern:*

Be it known that I, ROBERT SCHULER, a citizen of the United States, residing at New York, in the county of New York and State of New York, have invented new and useful Improvements in Waterproof Cement and Methods of Making, of which the following is a specification.

The object of the present invention, is the production of a water-proof cement of excellent binding power, which may be used by mixing in the usual way with concrete aggregates, such as sand, gravel, stone and water.

It has been proposed by several inventors to add materials to Portland cement for the purpose of water-proofing the same, and otherwise, improving the character of the cement as well as the concrete or other articles made therefrom. Lime soaps have been used which give reasonably good results so far as the water-proofing is concerned, but with a somewhat smaller strength of the finished article. Also ordinary soaps have been used, in order to produce a somewhat similar result.

In carrying out my invention in its preferred form, I add to 100 lbs. of Portland cement the following ingredients: 1½ lbs. of powdered potash alum, 1½ lbs. of potash soap (dry), 14 lbs. of pozzuolana cement, 12 lbs. of hydrated lime $Ca(OH)_2$. These materials should be added to the cement separately and thoroughly mixed therewith, after which, the entire mass of cement should be thoroughly mixed together and is then ready for shipment or use. In carrying out the invention in the preferred form, I mix the alum with a small amount (5 or 10 lbs.) of cement and mix the soap with another 5 or 10 lbs. of cement, and mix the pozzuolana cement with 15 to 20 lbs. of the Portland cement, and mix the lime with 15 to 20 lbs. of the Portland cement. After this, enough more cement is added to bring the total up to about 100 lbs., after which the entire batch of cement is carefully and thoroughly mixed. In this manner the mixture of the materials with the cement is made very thorough and the alum, soap, pozzuolana cement and hydrated lime do not react with each other, but remain as such, mixed with the cement until the water is added to the cement. If desired separate portions of the cement clinker may be mixed with the separate ingredients and ground therewith in order to produce a thorough mixture.

While I have given a specific example, stating the exact proportions of certain materials, it is to be noted that the invention is not restricted to these particular proportions, since more or less variation is permissible.

What I claim is:—

1. A water-proof cement comprising Portland cement, alum, a soluble soap, pozzuolana cement and hydrated lime, mixed together.

2. A water-proof cement mixture comprising 200 parts, Portland cement, 3 parts alum, 3 parts potash soap, 28 parts pozzuolana cement, and 24 parts hydrated lime, thoroughly intermixed.

3. The process of producing a water-proof Portland cement, which comprises mixing separate portions of the cement with suitable amounts of alum, soluble soap, pozzuolana cement and hydrated lime, and thereafter mixing these portions together.

4. The process of producing a water-proof Portland cement, which comprises thoroughly mixing separate portions of the cement with 3 parts alum, 3 parts potash soap, 28 parts pozzuolana cement and 24 parts hydrated lime, and thereafter mixing the separate portions thoroughly with each other, the total amount of Portland cement being 200 parts.

In testimony whereof I affix my signature in presence of two witnesses.

ROBERT SCHULER.

Witnesses:
 Jos. F. STEEPKA,
 IVAN T. QUICK.